Aug. 17, 1926.
C. B. LOFTUS
SOCKET AND SHADE SUPPORT
Filed April 22, 1926
1,596,746
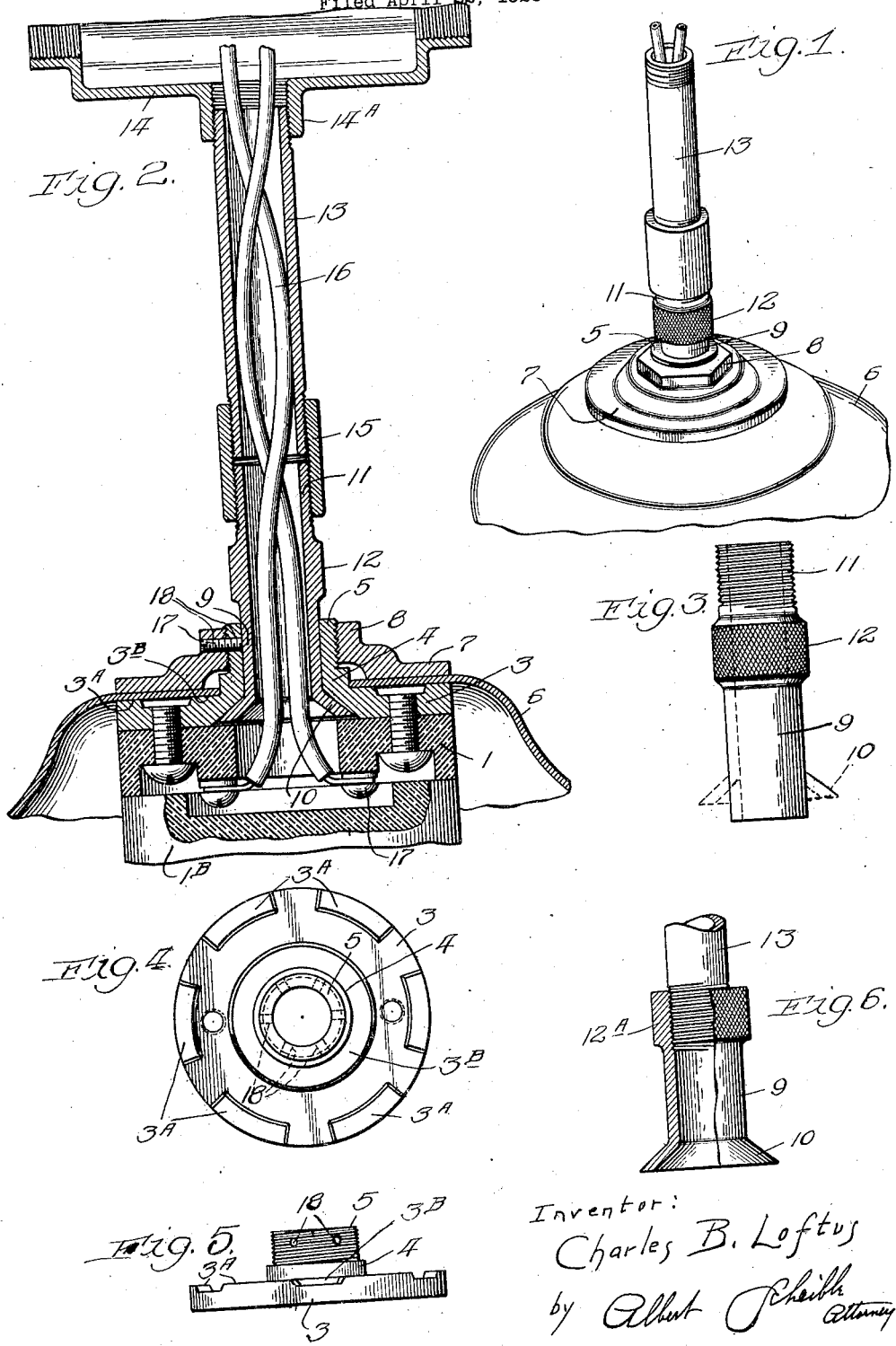
Inventor:
Charles B. Loftus
by Albert Scheible
Attorney Patented Aug. 17, 1926.

1,596,746

UNITED STATES PATENT OFFICE.

CHARLES B. LOFTUS, OF CHICAGO, ILLINOIS.

SOCKET AND SHADE SUPPORT.

Application filed April 22, 1926. Serial No. 104,032.

My invention relates to means for connecting lamp-sockets and shades to threaded supports, and particularly to means for securing sockets and shades simultaneously to the wire ducts which support them.

In employing lamp-sockets in connection with metal shades and pendent wire ducts, it has heretofore been customary to assemble the parts on the job and to twist the wires to a considerable extent while making a part of the mechanical connection by rotating the shade and socket while screwing the supporting clamp upon the pendent pipe (or the conduit fitting) by which the socket and shade assembly is to be supported.

This practice has two serious objections, one being the inconvenience and relatively high cost of doing all of this assembling and connecting on the job. Since such sockets and shades are usually placed high above the ground, the electrician installing the same must work on a ladder, where the necessity of balancing himself interferes with speedy work. In one of its important aspects, my invention aims to provide a socket and shade support adapted to be assembled in the contractor's shop, or elsewhere at an ordinary bench, thereby greatly reducing the overhead manipulation and correspondingly reducing the cost of the installation.

Another serious objection to the heretofore customary practice lies in the fact that in threadedly attaching the ordinary socket and shade support to the pendent pipe, this support has to be rotated after the wires (which run through the pipe) have been secured to the base of the socket. This rotation intertwists the wires and, unless sufficient slack has been allowed in these wires, they are apt to be overstrained and broken, thereby making it necessary for a man on a ladder to disconnect, rewire and reassemble the entire fixture. So also, in case of damage to the socket or shade, neither could be replaced without untwisting and retwisting the wires, thereby again introducing the likelihood of overstraining the wires.

My present invention aims to overcome this objection also, by providing a socket and shade support in which the socket is attached to a swiveling member which need not be rotated at all during the threaded attaching of this assemblage to a pipe or conduit fitting, thereby entirely avoiding any twisting of the wires. Moreover, my invention aims to provide a socket and shade support assemblage which can be employed with equal advantage in connection with male or female threaded connections to supporting duct portions.

In the drawings, Fig. 1 is a perspective view showing an assemblage made at a bench in accordance with my invention, ready for attaching the same to a ceiling conduit fitting, with all except the upper portion of the shade cut away.

Fig. 2 is an enlarged central and vertical section through the same assemblage after the upper (or supporting) duct has been threaded into the conduit fitting.

Fig. 3 is an elevation of the swiveling member of my device as initially manufactured, with dotted lines showing the later flaring of the lower end of this member.

Fig. 4 is a plan view of the socket-supporting member.

Fig. 5 is an elevation of the shade-clamping flange.

Fig. 6 is a partly sectional elevation of a swiveling member employed when my device is to be attached to a supporting pipe having a male thread.

In the embodiment of Figs. 1 to 5, the base 1 of the lamp-socket is secured by screws 2 to the base flange 3 of a socket-supporting member which has an upwardly projecting tubular stem 4 surmounted by a smaller-diametered and externally threaded shank 5. The outside diameter of the stem 4 desirably corresponds approximately to the bore of the metal shade 6 which has its radially inner portion resting upon the top of the flange 3, and which shade portion is clamped down upon this flange by a clamping flange 7. This clamping flange has a central boss 8 threaded in its bore to fit the shank 5 of the socket support, and the exterior of this boss is preferably polygonal, as shown in Fig. 1, while the bottom of the boss is cupped out (as shown in Fig. 2) so as to clear the top of the tubular stem 4 of the socket support.

Extending through this stem 4 and the threaded shank 5 above the latter is the lower stem portion 9 of a swiveling member, which portion initially has this part 9 cylindrical and rotatably fitting the bore of the said shank and stem so that it can be inserted into the said bore from the top of my socket support. After the said portion 9 is thus inserted, its lower end is flared out (as in Fig. 6) to provide a lower swiveling end 10 which fits into a correspondingly tapered lower part of the bore of the socket-support. The swiveling member also includes an upper threaded part 11 and a diametrically enlarged part 12 which is interposed between the parts 9 and 11, which part 12 desirably is knurled as shown in Fig. 3.

In employing such a socket and shade support in connection with a ceiling conduit fitting 14 and a pendent supporting pipe 13, which pipe may be varied in length according to the desired spacing of the socket from the ceiling, the conduit fitting 14 is first positioned on the ceiling with the conduits and the supply wires running into it in the usual manner.

The other parts can all be secured to each other at a floor bench to form the assemblage shown in Fig. 1, this being done either on the job or at the contractor's shop. The socket support is made up at the factory with the swiveling member extending through it and flared out at its lower end, and the flange 3 of this support is first attached to the base 1 of the two-part lamp socket by the screws. Then the shade is slipped over the tubular stem of the swiveling member and the clamping member is screwed down on the threaded part 5 of the support so that the clamping flange 7 clamps the top of the shade against the flange 3. The polygonal part 8 can be readily gripped for rotating the clamping flange to effect this clamping, and the flange 3 preferably has spaced riser portions at its outer edge which tend to indent the top of the shade and hence will cooperate with the said clamping to prevent the shade from rotating on my support, and the flange 3 may also have a more inward annular portion 3ᴮ against which the radially inner portion of the shade is clamped.

A pipe nipple 15 is then screwed upon the threaded upper portion 11 of the swiveling member and the pendent pipe 13 is threaded into this until jammed by the usual taper of the thread. I then run the wires 16 through the pipe 13 and the bore of the swiveling member and connect the lower ends of the wires to the usual terminal screws 17 on the socket base, the wires being of slightly greater length than that needed for reaching through the pendent pipe to the wires in the conduit fitting. The main socket part 1ᴮ is then attached to the socket base 1 in the usual manner, thereby completing the assemblage which is all made at a convenient bench.

In installing this assemblage, the electrician on the ladder merely slips the projecting upper wires through the usual bottom outlet 14ᴬ of the conduit fitting, screws the entire assemblage to the conduit fitting by turning the knurled part 12, and then connects the wires 16 in the usual manner to the supply wires running into the conduit fitting. In thus screwing the assemblage to the conduit fitting, either the polygonal part 8 of the clamping member or the shade 6 can be held to prevent the socket from rotating, thereby preventing a twisting of the wires 16. Moreover, a possible loosening of the clamping attachment of the shade to the support can be prevented by tightening a screw 17 which is threaded through the polygonal part 8 and which extends freely through any selected one of a number of perforations 18 in the part 5 of the support and into engagement with the tubular stem portion 9 of the swiveling member.

Where the shade is to be placed close to the supporting conduit fitting, the pendent pipe 13 is omitted and the upper threaded end 11 of the swiveling member is screwed direct into the outlet 14ᴬ of the conduit fitting. Furthermore, the same socket and support can obviously be used for attachment to wall fittings or in connection with bent pipes instead of the straight pipe 13 of Figs. 1 and 2. So also, my invention may be employed without the interposition of a pipe nipple 15 by providing the swiveling member with an upper knurled end 12ᴬ which has a female thread for direct attachment to the pendent or other supporting pipe 13. Hence I do not wish to be limited to the details of construction and arrangement above described, since many modifications might be made without departing either from the spirit of my invention or from the appended claims.

I claim as my invention:

1. Means for supporting a lamp-socket and a shade; comprising a socket carrier interposed between the lamp-socket and the shade and secured to the socket; the carrier having a perforation in axial alinement with the socket; means attachable to the carrier after the socket is secured to the carrier, for clamping the shade to the carrier; and a tubular stem extending through the said perforation and rotatable upon the carrier; the stem having a radially enlarged end disposed between the carrier and the socket, and having its other end threaded for attachment to a support.

2. Means for supporting a pendent lamp socket and a shade housing the socket; comprising a flange secured to the top of the socket and having an exteriorly threaded and tubular riser shank extending through the shade; a nut threaded on the said shank and clamping the shade to the top of the flange; and a tubular stem journaled in the bore of the flange and having its lower end radially enlarged to underhang a part of the flange, the stem having means at its upper end for threadedly attaching it to a support.

3. Means for supporting a pendent lamp-socket and a shade housing the socket; comprising a socket carrier having a flange secured to the top of the socket and having a riser shank extending through the shade in axial alinement with the socket, the riser being threaded at its upper end and having an axial bore flared out at its lower end; a clamping member threaded on the riser and clamping the shade against the said flange; and a swiveling member comprising a tube threaded at its upper end and journaled in the bore of said shank and having its lower end flared out into engagement with the flaring portion of the said shank bore, the said tube extending upwardly through the bore of the shank and having a knurled portion interposed between the threaded upper end of the tube and the upper end of the said shank.

Signed at Chicago, Illinois, April 3rd, 1926.

CHARLES B. LOFTUS.